(12) United States Patent
Yin et al.

(10) Patent No.: US 8,246,713 B2
(45) Date of Patent: Aug. 21, 2012

(54) PREPARATION OF A NANO LONG-ACTING SELENIUM FERTILIZER

(75) Inventors: Xuebin Yin, Suzhou (CN); Ying Liu, Suzhou (CN); Wen Tian, Suzhou (CN)

(73) Assignee: Suzhou Setek Co., Ltd., Jiangsu (CN)

( * ) Notice: Subject to any disclaimer, the term of this patent is extended or adjusted under 35 U.S.C. 154(b) by 58 days.

(21) Appl. No.: 12/879,813

(22) Filed: Sep. 10, 2010

(65) Prior Publication Data

US 2010/0326153 A1    Dec. 30, 2010

Related U.S. Application Data

(63) Continuation of application No. PCT/CN2009/070757, filed on Mar. 12, 2009.

(30) Foreign Application Priority Data

Mar. 12, 2008    (CN) .......................... 2008 1 0007499

(51) Int. Cl.
*C05D 9/00* (2006.01)
*C05D 9/02* (2006.01)
(52) U.S. Cl. ..................................... 71/62; 71/31; 71/63
(58) Field of Classification Search ................. 71/31, 62
See application file for complete search history.

(56) References Cited

FOREIGN PATENT DOCUMENTS

| CN | 1446776 | 10/2003 |
|---|---|---|
| CN | 1475468 | 2/2004 |

OTHER PUBLICATIONS

International Search Report & Written Opinion of the International Searching Authority for International Application No. PCT/CN2009/070757.
Xu, Juan, et al., "Effect of Foliar Application of Selenium on the Antioxidant Activity of Aqueous . . . ", Scientific Ministry of China, Accepted Jan. 20, 2004, P.R. of China.

*Primary Examiner* — Colleen Dunn
*Assistant Examiner* — Jennifer Smith
(74) *Attorney, Agent, or Firm* — McCarter & English, LLP

(57) ABSTRACT

The present invention provides a process for preparation of a fertilizer, particularly a process for preparation of a nano long-acting selenium fertilizer. The present invention provides a process for preparation of a long-acting selenium fertilizer, including: mixing a selenium rich carbonaceous siliceous rock powder having 30-95% of nano particles relative to total volume and a selenium content of 500 μg/g or more with a liquid having pH of 8.0-10.0. The liquid having pH of 8.0-10.0 is obtained by mixing KOH, $K_2CO_3$ and 20% ammonia in a weight ratio of 10:1:2, and then adjusting pH with water.

5 Claims, No Drawings

PREPARATION OF A NANO LONG-ACTING SELENIUM FERTILIZER

CROSS-REFERENCE TO RELATED APPLICATIONS

This application is a continuation of International Application No. PCT/CN2009/070757, filed Mar. 12, 2009, which designates the United States, and claims priority to Chinese Patent Application No. 200810007499.3, filed on Mar. 12, 2008, all of which are incorporated by reference in their entireties as if fully set forth herein.

FIELD OF THE INVENTION

The present invention relates to a process for preparation of a fertilizer, particularly to a process for preparation of a nano long-acting selenium fertilizer.

BACKGROUND OF THE INVENTION

Some studies show that selenium (Se) can participate in the in vivo synthesis of glutathione peroxidase (GSH-Px), superoxide dismutase (SOD) and many selenium-containing proteins in organisms, and these substances have certain functions for eliminating free radicals and lipid peroxidation in organism, thereby reducing toxic hazards (Marrs, 1996; Wu Jun et al., 1999; Xue et al., 2001; Yin et al., 2007; Lin et al., 2008). In some selenium deficient regions of China (such as Keshan county in Helongjing Province), selenium deficiency may cause fatal myocardosis, which is also called as Keshan disease (Li et al., 2000). The population of these regions may alleviate symptoms of selenium deficiency by taking selenium agents, eating selenium-enriched common salt and selenium-enriched foods (Chen et al., 1993; Zhou Yang et al., 2004). The advantages of selenium-enriched foods such as easy absorption and rare-poisoning promote the cultivation and production of selenium-enriched crop plants. Besides China, Finland government also elevates selenium content of foodstuffs by applying selenium-enriched fertilizer (Levander, 1989). Selenium is applied in manners including foliage spray, soil application, seed dressing or water planting selenium application (Yang Guangqi, 1990; Zhou Xunbo et al., 2002; Hu et al., 2002; Xu and Hu, 2004).

SUMMARY OF THE INVENTION

In the present invention, a selenium fertilizer additive having a selenium content of 1,000-5,000 mg/kg is formed by using selenium rich carbonaceous siliceous rock abundant in nature as raw material, superfine pulverizing until having 30-95% of nano particles relative to total volume, subjecting to a heating and cooling procedure for several times and to repeated activation by spraying alkaline water, and mixing with quartz sands as an inert filling in a certain ratio.

The present invention provides a process for preparation of a safe and effective nano long-acting selenium fertilizer to solve problems in the art, the problems including large residual quantity of inorganic selenium and difficulty of quantity control in foliage spray, and poor sustained-release property and short manorial effect in soil application.

The present invention provides a process for preparation of a nano long-acting selenium fertilizer, comprising: mixing a selenium rich carbonaceous siliceous rock powder having 30-95% of nano particles relative to total volume and a selenium content of 500 µg/g or more with a liquid having pH of 8.0-10.0.

Preferably, the liquid having pH of 8.0-10.0 is obtained by mixing KOH, $K_2CO_3$ and 20% ammonia in a weight ratio of 10:1:2, and then adjusting pH with water.

Preferably, the selenium rich carbonaceous siliceous rock powder is mixed with the liquid having pH of 8.0-10.0 at 60-80° C.

Preferably, the selenium rich carbonaceous siliceous rock powder is mixed with the liquid having pH of 8.0-10.0 in a weight ratio of 20:1-3.

The present invention further provides a nano long-acting selenium fertilizer obtained by the above process.

The present invention further provides a composition obtainable by mixing the above nano long-acting selenium fertilizer with quartz sands in a weight ratio of 8-9:1-2.

DETAILED DESCRIPTION OF THE INVENTION

The preparation of the present invention is presented below in the context of a number of embodiments; it being understood that the present invention may incorporate different combinations of the presented elements.

Reduction of Usage Level: The nono long-acting selenium fertilizer of the present invention is a nano selenium plant nutrient formed by using a rock material with high selenium content and low harmful residues, subjecting to a pure physical process to pulverize the rock material to nano particles. The use ratio of selenium is high, and a usage level of 5 kg per mu can reach more than double the selenium content of crop, while the usage level is only 1/20 of that in conventional technology.

Cyclic Utilization of Selenium Rich Substance and More Green and Scientific Production: the selenium rich rock used as raw material is a natural substance or product and can partially consume products from agricultural production, so that the nutrient can increase selenium content, enhance soil fertility and improve soil structure.

Safe state of Biological Organic Selenium Produced by Crop: since mineral selenium is absorbed and transformed by root and whole plant to exist in organic selenium forms such as selenium-glutamic acid, selenium-cysteine, selenium-methyl-cysteine, etc. which can facilitate the absorption of selenium by human body and improve safety.

Significant Sustained-Release Property: usually, the effective selenium in soil can be maintained for three months or more by one time application, which can meet the requirement of selenium for one crop growing.

Low Risk of Pollution: the sustained-release of selenium from the product enables good control of crop absorption and results low risk of pollution for environmental medium such as underground water, surface water and soil.

The following examples are to illustrate the present invention, but not to restrict the scope of the present invention.

In the present invention, a selenium fertilizer additive having a selenium content of 1,000-5,000 mg/kg is formed by using selenium rich carbonaceous siliceous rock abundant in nature as raw material, superfine pulverizing until having 30-95% of nano particles relative to total volume, subjecting to a heating and cooling procedure for several times and to repeated activation by spraying alkaline water, and mixing with quartz sands as an inert filling in a certain ratio.

Firstly, four raw materials having nano particles of 20%, 30%, 95% and 98% relative to total volume were used and subjected to the following production process, then effective selenium contents were determined to illustrate the optimum range of nano particles in view of cost and effects.

Example 1

Natural selenium rich carbonaceous siliceous rock having a selenium content of 1,000 µg/g was used as raw material and subjected to the following production process, and then effective selenium content was determined.

Step (1): the rock was pre-pulverized to 10 mesh (particle size <2 mm).

Step (2): the 10 mesh sample was further superfine pulverized, in which a laser particle analyzer was used to monitor pulverization effect and control the pulverization so that nano particles occupied 20% of total volume.

Step (3): the selenium rich carbonaceous siliceous rock powder was mixed at 60° C. with a liquid having pH of 10.0 in a weight ratio of 10:1.

The liquid having pH of 10.0 was obtained by mixing KOH, $K_2CO_3$ and 20% ammonia in a weight ratio of 10:1:2, and then adjusting pH with water.

Step (4): mixing with quartz sands in a weight ratio of mineral powder:quartz sands=9:1.

The product had a biologically effective selenium content of 30 µg/g, which was about 3% of the total selenium content, in which selenium in water-soluble state and exchangeable state were of 45% and 55%, respectively, potentially available selenium in acid-soluble state and organically binding state was of 20% relative to the total selenium content, and residual selenium was available after efflorescence.

Example 2

Natural selenium rich carbonaceous siliceous rock having a selenium content of 1,000 µg/g was used as raw material and subjected to the following production process, and then effective selenium content was determined.

Step (1): the rock was pre-pulverized to 10 mesh (particle size <2 mm).

Step (2): the 10 mesh sample was further superfine pulverized, in which a laser particle analyzer was used to monitor pulverization effect and control the pulverization so that nano particles occupied 30% of total volume, and energy consumption cost increased by 20% in comparison with that of Example 1.

Step (3): the selenium rich carbonaceous siliceous rock powder was mixed at 60° C. with a liquid having pH of 10.0 in a weight ratio of 10:1.

The liquid having pH of 10.0 was obtained by mixing KOH, $K_2CO_3$ and 20% ammonia in a weight ratio of 10:1:2, and then adjusting pH with water.

Step (4): mixing with quartz sands in a weight ratio of mineral powder:quartz sands=9:1.

The product had a biologically effective selenium content of 50 µg/g, which was about 5% of the total selenium content, in which selenium in water-soluble state and exchangeable state were of 45% and 55%, respectively, potentially available selenium in acid-soluble state and organically binding state was of 30% relative to the total selenium content, and residual selenium was available after efflorescence.

Example 3

Natural selenium rich carbonaceous siliceous rock having a selenium content of 1,000 µg/g was used as raw material and subjected to the following production process, and then effective selenium content was determined.

Step (1): the rock was pre-pulverized to 10 mesh (particle size <2 mm).

Step (2): the 10 mesh sample was further superfine pulverized, in which a laser particle analyzer was used to monitor pulverization effect and control the pulverization so that nano particles occupied 95% of total volume, and energy consumption cost increased by 30% in comparison with that of Example 1.

Step (3): the selenium rich carbonaceous siliceous rock powder was mixed at 60° C. with a liquid having pH of 10.0 in a weight ratio of 10:1.

The liquid having pH of 10.0 was obtained by mixing KOH, $K_2CO_3$ and 20% ammonia in a weight ratio of 10:1:2, and then adjusting pH with water.

Step (4): mixing with quartz sands in a weight ratio of mineral powder:quartz sands=9:1.

The product had a biologically effective selenium content of 80 µg/g, which was about 8% of the total selenium content, in which potentially available selenium in acid-soluble state and organically binding state was of 40% relative to the total selenium content, and residual selenium was available after efflorescence.

Example 4

Natural selenium rich carbonaceous siliceous rock having a selenium content of 1,000 µg/g was used as raw material and subjected to the following production process, and then effective selenium content was determined.

Step (1): the rock was pre-pulverized to 10 mesh (particle size <2 mm).

Step (2): the 10 mesh sample was further superfine pulverized, in which a laser particle analyzer was used to monitor pulverization effect and control the pulverization so that nano particles occupied 98% of total volume, and energy consumption cost increased by 100% in comparison with that of Example 1.

Step (3): the selenium rich carbonaceous siliceous rock powder was mixed at 60° C. with a liquid having pH of 10.0 in a weight ratio of 10:1.

The liquid having pH of 10.0 was obtained by mixing KOH, $K_2CO_3$ and 20% ammonia in a weight ratio of 10:1:2, and then adjusting pH with water.

Step (4): mixing with quartz sands in a weight ratio of mineral powder:quartz sands=9:1.

The product had a biologically effective selenium content of 80 µg/g, which was about 8% of the total selenium content, in which potentially available selenium in acid-soluble state and organically binding state was of 40% relative to the total selenium content, and residual selenium was available after efflorescence.

It can be seen that the optimum range of nano particles was 30-95%, and a range higher or lower than this range would have significantly difference in effectiveness and cost.

In the following examples, a raw material having a selenium content of 3,000 µg/g was used, superfine pulverized so that nano particles occupied 40% of total volume, and the effects of pH value of activating solution were observed. The effective selenium content was determined after the following production process.

Example 5

Natural selenium rich carbonaceous siliceous rock having a selenium content of 3,000 µg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 7.5 in a weight ratio of 10:1.

The liquid having pH of 7.5 was obtained by mixing KOH, $K_2CO_3$ and 20% ammonia in a weight ratio of 10:1:2, and then adjusting pH with water. After cooling to room temperature, the above step was repeated for three times.

Step (2): mixing with quartz sands in a weight ratio of mineral powder:quartz sands=9:1.

The product had a biologically effective selenium content of 90 μg/g, which was about 3.0% of the total selenium content, in which selenium in water-soluble state and exchangeable state were of 45% and 55%, respectively, potentially available selenium in acid-soluble state and organically binding state was of 20% relative to the total selenium content, and residual selenium was available after efflorescence.

Example 6

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 8.0 in a weight ratio of 10:1.

The liquid having pH of 8.0 was obtained by mixing KOH, $K_2CO_3$ and 20% ammonia in a weight ratio of 10:1:2, and then adjusting pH with water. After cooling to room temperature, the above step was repeated for three times.

Step (2): mixing with quartz sands in a weight ratio of mineral powder:quartz sands=9:1.

The product had a biologically effective selenium content of 120 μg/g, which was about 4% of the total selenium content, in which selenium in water-soluble state and exchangeable state were of 45% and 55%, respectively, potentially available selenium in acid-soluble state and organically binding state was of 28% relative to the total selenium content, and residual selenium was available after efflorescence.

Example 7

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 10.0 in a weight ratio of 10:1.

The liquid having pH of 10.0 was obtained by mixing KOH, $K_2CO_3$ and 20% ammonia in a weight ratio of 10:1:2, and then adjusting pH with water. After cooling to room temperature, the above step was repeated for three times.

Step (2): mixing with quartz sands in a weight ratio of mineral powder:quartz sands=9:1.

The product had a biologically effective selenium content of 150 μg/g, which was about 5% of the total selenium content, in which selenium in water-soluble state and exchangeable state were of 45% and 55%, respectively, potentially available selenium in acid-soluble state and organically binding state was of 30% relative to the total selenium content, and residual selenium was available after efflorescence.

Example 8

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 11.0 in a weight ratio of 10:1.

The liquid having pH of 11.0 was obtained by mixing KOH, $K_2CO_3$ and 20% ammonia in a weight ratio of 10:1:2, and then adjusting pH with water. After cooling to room temperature, the above step was repeated for three times.

Step (2): mixing with quartz sands in a weight ratio of mineral powder:quartz sands=9:1.

The product had a biologically effective selenium content of 180 μg/g, which was about 6% of the total selenium content, in which selenium in water-soluble state and exchangeable state were of 45% and 55%, respectively, potentially available selenium in acid-soluble state and organically binding state was of 32% relative to the total selenium content, and residual selenium was available after efflorescence.

In view of the above experimental results, the liquid having pH of 11.0 obtained by mixing KOH, $K_2CO_3$ and 20% ammonia in a weight ratio of 10:1:2 and then adjusting pH with water was chosen.

In the following examples, spray concentration was chosen. The above selenium rich carbonaceous siliceous rock powder was mixed with a liquid having pH of 8.0-10.0 in a weight ratio of 20:1-3 in view of increasing effective state, controlling energy consumption cost and reducing difficulty of homogenous application.

Example 9

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 10.0 in a weight ratio of 100:3.

The liquid having pH of 10.0 was obtained by mixing KOH, $K_2CO_3$ and 20% ammonia in a weight ratio of 10:1:2, and then adjusting pH with water. After cooling to room temperature, the above step was repeated for six times.

Step (2): mixing with quartz sands in a weight ratio of mineral powder:quartz sands=9:1.

The product had a biologically effective selenium content of 90 μg/g, which was about 3.0% of the total selenium content, in which selenium in water-soluble state and exchangeable state were of 45% and 55%, respectively, potentially available selenium in acid-soluble state and organically binding state was of 20% relative to the total selenium content, and residual selenium was available after efflorescence.

Example 10

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 10.0 in a weight ratio of 20:1.

The liquid having pH of 10.0 was obtained by mixing KOH, $K_2CO_3$ and 20% ammonia in a weight ratio of 10:1:2, and then adjusting pH with water. After cooling to room temperature, the above step was repeated for six times.

Step (2): mixing with quartz sands in a weight ratio of mineral powder:quartz sands=9:1.

The product had a biologically effective selenium content of 135 μg/g, which was about 4.5% of the total selenium content, in which selenium in water-soluble state and exchangeable state were of 45% and 55%, respectively, potentially available selenium in acid-soluble state and organically binding state was of 28% relative to the total selenium content, and residual selenium was available after efflorescence.

Example 11

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 10.0 in a weight ratio of 20:3.

The liquid having pH of 10.0 was obtained by mixing KOH, $K_2CO_3$ and 20% ammonia in a weight ratio of 10:1:2, and then adjusting pH with water. After cooling to room temperature, the above step was repeated for six times.

Step (2): mixing with quartz sands in a weight ratio of mineral powder:quartz sands=9:1.

The product had a biologically effective selenium content of 150 μg/g, which was about 5% of the total selenium content, in which selenium in water-soluble state and exchangeable state were of 45% and 55%, respectively, potentially available selenium in acid-soluble state and organically binding state was of 30% relative to the total selenium content, and residual selenium was available after efflorescence.

Example 12

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 10.0 in a weight ratio of 5:1.

The liquid having pH of 10.0 was obtained by mixing KOH, $K_2CO_3$ and 20% ammonia in a weight ratio of 10:1:2, and then adjusting pH with water. After cooling to room temperature, the above step was repeated for six times.

Step (2): mixing with quartz sands in a weight ratio of mineral powder:quartz sands=9:1.

The product had a biologically effective selenium content of 150 μg/g, which was about 5% of the total selenium content, in which selenium in water-soluble state and exchangeable state were of 45% and 55%, respectively, potentially available selenium in acid-soluble state and organically binding state was of 30% relative to the total selenium content, and residual selenium was available after efflorescence.

The above experiments showed that significantly improved effects could be achieved when the mixture ratio of the selenium rich carbonaceous siliceous rock powder to the liquid having pH of 8.0-10.0 was 20:1-3.

Example 13

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 50° C. with a liquid having pH of 10.0 in a weight ratio of 20:1.

The liquid having pH of 10.0 was obtained by mixing KOH, $K_2CO_3$ and 20% ammonia in a weight ratio of 10:1:2, and then adjusting pH with water. After cooling to room temperature, the above step was repeated for six times.

The results showed that the product obtained at this temperature had a high water content and was difficult for storage.

Example 14

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 60° C. with a liquid having pH of 10.0 in a weight ratio of 20:1.

The liquid having pH of 10.0 was obtained by mixing KOH, $K_2CO_3$ and 20% ammonia in a weight ratio of 10:1:2, and then adjusting pH with water. After cooling to room temperature, the above step was repeated for six times.

Step (2): mixing with quartz sands in a weight ratio of mineral powder:quartz sands=9:1.

The product had a biologically effective selenium content of 135 μg/g, which was about 4.5% of the total selenium content, in which selenium in water-soluble state and exchangeable state were of 45% and 55%, respectively, potentially available selenium in acid-soluble state and organically binding state was of 28% relative to the total selenium content, and residual selenium was available after efflorescence.

Example 15

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 80° C. with a liquid having pH of 10.0 in a weight ratio of 20:1.

The liquid having pH of 10.0 was obtained by mixing KOH, $K_2CO_3$ and 20% ammonia in a weight ratio of 10:1:2, and then adjusting pH with water. After cooling to room temperature, the above step was repeated for six times.

Step (2): mixing with quartz sands in a weight ratio of mineral powder:quartz sands=9:1.

The product had a biologically effective selenium content of 150 μg/g, which was about 5% of the total selenium content, in which selenium in water-soluble state and exchangeable state were of 45% and 55%, respectively, potentially available selenium in acid-soluble state and organically binding state was of 30% relative to the total selenium content, and residual selenium was available after efflorescence.

Example 16

Natural selenium rich carbonaceous siliceous rock having a selenium content of 3,000 μg/g was used as raw material, pre-pulverized and superfine pulverized, subjected to the following production process, and then effective selenium content was determined.

Step (1): the selenium rich carbonaceous siliceous rock powder was mixed at 90° C. with a liquid having pH of 10.0 in a weight ratio of 20:1.

The liquid having pH of 10.0 was obtained by mixing KOH, $K_2CO_3$ and 20% ammonia in a weight ratio of 10:1:2, and then adjusting pH with water. After cooling to room temperature, the above step was repeated for six times.

Step (2): mixing with quartz sands in a weight ratio of mineral powder:quartz sands=9:1.

The product had a biologically effective selenium content of 150 μg/g, which was about 5% of the total selenium content, in which selenium in water-soluble state and exchangeable state were of 45% and 55%, respectively, potentially available selenium in acid-soluble state and organically binding state was of 28% relative to the total selenium content, and residual selenium was available after efflorescence.

The above examples showed that a proper drying temperature was 60-80° C.

In addition, the inventors further found that after the nano long-acting selenium fertilizers prepared in the above examples were mixed with quartz sands in a weight ratio of 8-9:1-2, the occurrence rate of agglomeration decreased significantly.

The inventors further determined the sustaining time of the nano long-acting selenium fertilizer provided in the present invention in soil. The determination results showed that after the nano long-acting selenium fertilizer of the present invention was applied for 90 days, the content of selenium in effective state in soil was still 60% or more relative to that of the application day.

While the invention has been shown herein in what is presently conceived to be the most practical and preferred embodiment thereof, it will be apparent to those of ordinary skill in the art that many modifications may be made thereof within the scope of the invention, which scope is to be accorded the broadest interpretation so as to encompass all equivalent structures and devices.

What is claimed is:

1. A process for preparation of a nano long-acting selenium fertilizer, comprising: mixing a selenium rich carbonaceous siliceous rock powder having 30-95% of nano particles relative to total volume and a selenium content of 500 μg/g or more with a liquid having pH of 8.0-10.0.

2. The process for preparation of a nano long-acting selenium fertilizer of claim 1, further comprising the step of forming the liquid having pH of 8.0-10.0 by mixing KOH, $K_2CO_3$ and 20% ammonia in a weight ratio of 10:1:2, and then adjusting pH with water.

3. The process for preparation of a nano long-acting selenium fertilizer of claim 1, wherein the mixing step comprises mixing the selenium rich carbonaceous siliceous rock powder with the liquid having pH of 8.0-10.0 at 60-80° C.

4. The process for preparation of a nano long-acting selenium fertilizer of claim 1, wherein the mixing step comprises mixing the selenium rich carbonaceous siliceous rock powder with the liquid having pH of 8.0-10.0 in a weight ratio of 20:1-3.

5. The process for preparation of a nano long-acting selenium fertilizer of claim 1, wherein the mixing step provides a resulting product, and further comprising mixing the resulting product with quartz sands in a weight ration of 8-9:1-2.

* * * * *